(12) United States Patent
Akiyama et al.

(10) Patent No.: US 6,328,898 B1
(45) Date of Patent: Dec. 11, 2001

(54) METHOD OF AND APPARATUS FOR FORMING HIGHLY OXIDATIVE WATER

(75) Inventors: Hidenori Akiyama, Kumamoto; Kenichi Inoue, Kobe; Akira Kobayashi, Kobe; Yoshihiro Yokota, Kobe; Shigeto Adachi, Takasago; Kazuhiko Asahara, Kobe, all of (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 1 day.

(21) Appl. No.: 09/599,885

(22) Filed: Jun. 23, 2000

(30) Foreign Application Priority Data

Jun. 24, 1999 (JP) .................................................. 11-178905
Jun. 24, 1999 (JP) .................................................. 11-178906

(51) Int. Cl.$^7$ ......................................................... C02F 1/72
(52) U.S. Cl. ..................... 210/748; 210/758; 210/198.1; 210/205
(58) Field of Search ..................................... 210/748, 758, 210/759, 760, 198.1, 205; 222/146.1

(56) References Cited

U.S. PATENT DOCUMENTS 5,843,307 * 12/1998 Faivre et al. ..
5,885,467 *  3/1999 Zelenak et al. ..
5,904,851 *  5/1999 Taylor et al. ..
6,132,629 * 10/2000 Boley .

FOREIGN PATENT DOCUMENTS

403254891A * 11/1991 (JP) .

* cited by examiner

*Primary Examiner*—Betsey Morrison Hoey
(74) *Attorney, Agent, or Firm*—Oblon, Spivak, McClelland, Maier & Neustadt, P.C.

(57) ABSTRACT

Highly oxidative water containing ozone and/or OH radicals dissolved in a large amount is prepared by dissolving an oxygen rich gas at high pressure in water and then the pressure is lowered to form fine bubbles in water from the dissolved oxygen rich gas and the fine bubbles are exposed to pulse discharge. Method of and apparatus capable of forming highly oxidative water containing ozone or OH radicals at high concentration exhibiting an oxidizing performance at a level sufficient to practical use with excellent power efficiency and productivity by discharge in water.

9 Claims, 5 Drawing Sheets

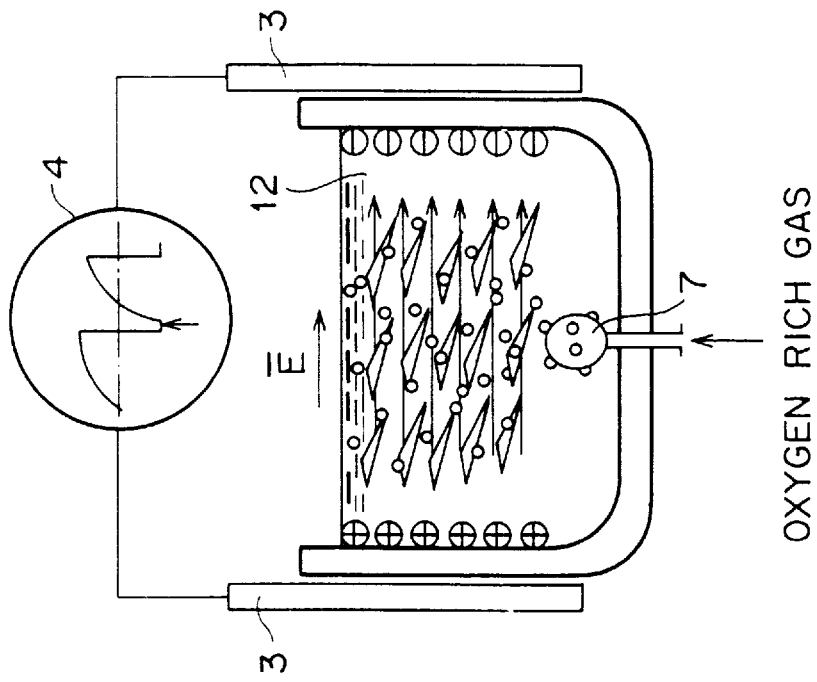
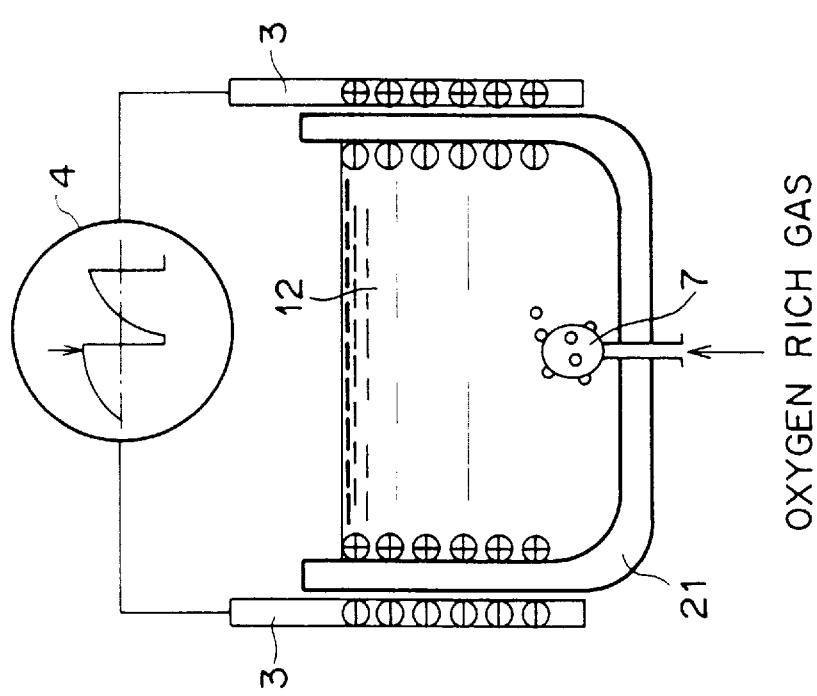

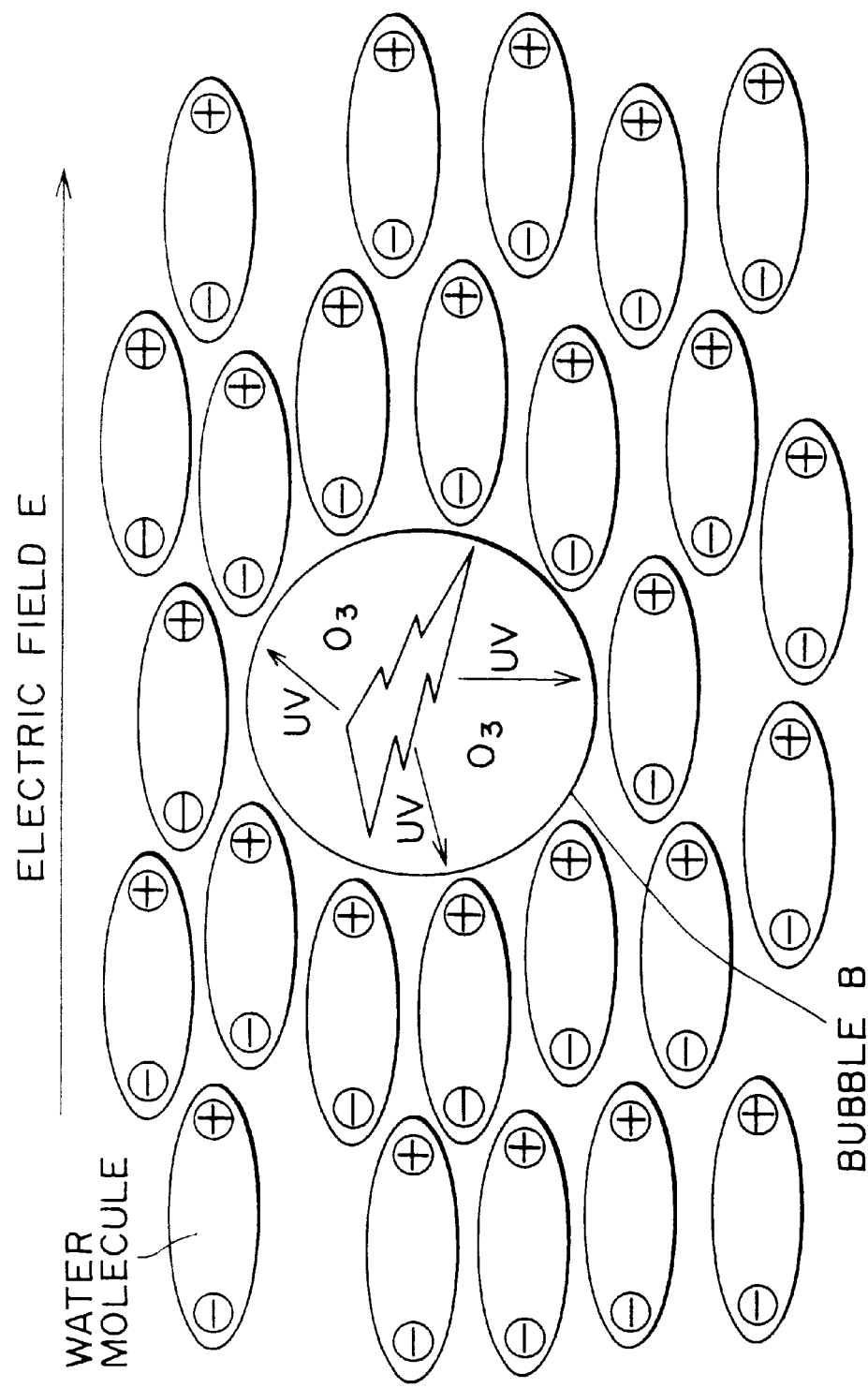

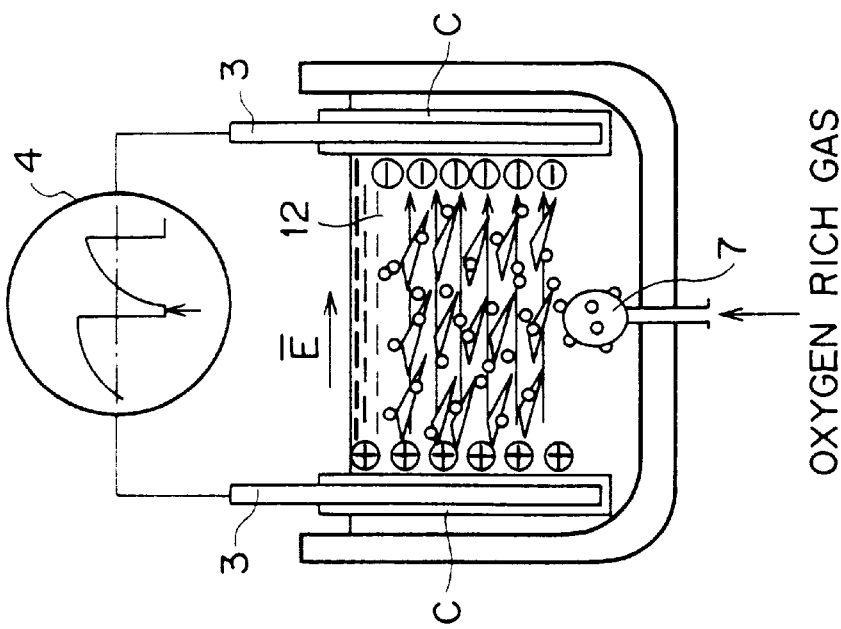
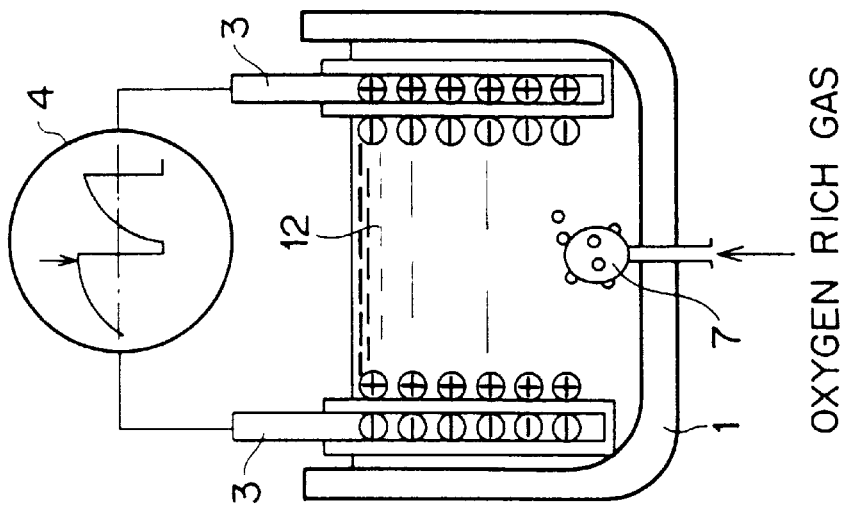

METHOD OF AND APPARATUS FOR FORMING HIGHLY OXIDATIVE WATER

BACKGROUND OF THE INVENTION

1. Field of the Invention

The present invention concerns a method of and an apparatus for forming highly oxidative water (water containing ozone and/or OH radicals at high concentration), for use in purification of water of lakes, marshes and rivers or contaminated water containing organic or inorganic deleterious materials such as industrial waste water, particularly, in toxifyng treatment of contaminated water containing less biodegradable deleterious organic materials, particularly, dioxin or the like, or in cleaning, resist defoliation and formation of oxide layers in the production of semiconductors.

The less biodegradable organic materials include, for example, natural or synthetic polymeric compounds such as celluloses, humines materials, surfactants, dyes, rubbers and resins; aromatic compounds such as benzene, toluene, xylene and phenol; aldehyde compounds such as acetaldehyde and crotone aldehyde, and oils and fats, higher fatty acids and other COD ingredients. Concrete example of waste water containing such deleterious organic materials include, for example, waste water from chemical plants, waste water from medicine factories, waste water from foodstuff factories, waste water from oils and fats factories, waste water from pulp factories, or like other industrial waste water, water of rivers and water of lake and marshes.

Further, in the semiconductor production processes, utilization is expected for as cleaning water in place of hydrofluoric acid cleaning, oxide layer forming agents in place of dense oxide layer formation using an oxidation furnace, and defoliating agents in place of resist defoliating agents using sulfuric acid or deleterious organic solvents.

2. Description of the Related Art

Biological treatment of waste water containing organic materials (water to be treated) under the presence of active sludges containing aerophilic or aerophobic microorganisms has been conducted generally. However, the biological treatment, if applied alone, requires a long time for the treatment in a case where less biodegradable materials such as polymeric materials, aromatic compounds and COD ingredients are contained in the waste water, failing to obtain a satisfactory cleaning effect. Further, if the quality of water to be treated fluctuates, the quality of the resultant purified water also fluctuates, failing to obtain cleaned water of stable cleanness.

In view of the above, when waste water containing less biodegradable materials is treated, a method of forming aqueous ozone by aerating and stirring gaseous ozone and transforming the materials described above into biodegradable materials by utilizing the oxidative activity of ozone is adapted. Known methods of obtaining gaseous ozone include a method of applying a high voltage from electrodes on both side ends of a air feed pipe through which air or oxygen rich air is sent, to conduct discharge and transform oxygen into ozone.

However, this method is extremely poor in the electric power efficiency, the gaseous ozone is instable of and tends to be decomposed thermally in contact with the wall surface upon pressurization, transportation or dissolution in water, so that the efficiency for the entire equipment is poor and lack in practicality.

For overcoming the problem in the prior art, Japanese Patent Publication No. Hei 5-87320 discloses a method of conducting discharge in waste water containing COD ingredients, thereby forming ozone or active oxygen species (OH radical) directly from dissolved air (oxygen) in water, or generating UV-rays as an accelerator to increase BOD/COD ratio, transforming the same into a biodegradable waste water and then applying biological treatment. However, since it is actually difficult to attain stable discharge in water over a wide area, it has not yet been put to practical use.

One of the methods of attaining the wide area discharge is discharge that utilizes high velocity pulses as described in Japanese Patent Laid-Open Hei 9-299785. Further, since it has been found that discharge in water proceeds with fine bubbles present to some extent in water being as nuclei, Japanese Patent Laid-Open Hei 5-319807 proposed a method of forming fine bubbles by positively and efficiently aerating air or oxygen between electrodes.

However, a technique capable of ensuring oxidative performance at a practical level by discharge in water (ozone and/or OH radical concentration) under stable power efficiency and productivity has not yet been established at present.

Further, in a case of discharge in water, since electrodes immersed water as an object to be processed are always exposed to a highly oxidative material (ozone or OH radicals) thus formed, it involves a problem that the surface of the electrodes is corroded. Further, upon treating waste water containing organic materials, particularly, in a case where aromatic compounds such as benzene, toluene, xylene and phenol are contained, they are decomposed as far as organic acids such as oxalic acid or formic acid to form acids, so that metal electrodes in direct contact with water are corroded remarkably to result in a significant problem in view of practical use.

Further, in a semiconductor application use is in which ultrapure water is used as water, since leaching of metal electrodes caused by the oxidative activity of water containing ozone or OH radicals (pollution) causes a significant problem, aqueous ozone for the semiconductor use is formed at present imitatively by an aeration/dissolution system of gaseous ozone and since this imposes a limit for increasing the ozone concentration, and gives a hindrance for putting into practical use as the highly oxidative water in place of existent oxidative chemicals.

For directly forming a highly oxidative water by discharge in water, it is important to attain discharge in water over a wide area and stably. For this purpose, it is important, for example, that fine bubbles of uniform size as nuclei for discharge are formed uniformly and efficiently over the entire discharge space, the bubbles themselves are mainly composed of oxygen as an oxidative source, a high voltage electric field has a function not concentrating locally but uniformly extending over the entire region of the discharge space, discharge is not joined and concentrated and that there is no problem caused by leaching of metal electrodes.

OBJECT OF THE INVENTION

Under the situations described above, it is an object of the present invention, in view of the important points to provide a method and an apparatus capable of obtaining highly oxidative water containing ozone or OH radicals at a high concentration and showing an oxidative performance at a level enough to practical use by discharge in water, with excellent power efficiency and productivity.

SUMMARY OF THE INVENTION

The foregoing object of the invention can be attained by a method in accordance with the present invention, which comprises dissolving an oxygen rich gas under a high pressure into water and then lowering a pressure to form the dissolved oxygen rich gas as fine bubbles in the water and exposing the fine bubbles to pulse discharge, thereby forming a highly oxidative water with a large dissolution amount of ozone and/or OH radicals.

When the method is applied to waste water containing organic or inorganic deleterious materials as water to be treated, waste water with a large dissolution amount of ozone and/or OH radicals can be formed by the treatment described above, thereby proceeding oxidation and decomposition of less biodegradable deleterious to enhance the cleaning efficiency by biological treatment, as well as the highly oxidative water which uses pure water or deionized water and to which ozone and OH radicals are dissolved in a large amount can be utilized effectively as highly oxidative cleaning water in the production of semiconductors, as a resist defoliation or an oxide layer forming agent on the surface of various kinds of metal materials.

Further, in a preferred embodiment, the pulse discharge is conducted by applying an AC pulse voltage to electrodes opposed to each other in a state not in contact with water in a discharge vessel and carrying out discharge in water by an electric field induced upon inversion of potential and generated in the discharge vessel.

In practicing the method of forming highly oxidative water, when fine bubbles comprising the oxygen rich gas are caused to be present in water in the discharge vessel, and the fine bubbles are exposed to the discharging atmosphere, oxygen is excited by the discharge in the fine bubbles to form ozone and OH radicals at the periphery of the fine bubbles by UV-rays generated by the discharge and they are dissolved in water to increase the concentration of ozone and/or OH radicals, so that highly oxidative water can be obtained at a higher efficiency.

Further, as will be described specifically later, for producing a polarization electric field by external electric field inversion from external electric field polarization of water molecules, in the discharge vessel, an AC pulse voltage applied to the electrodes is required to have a positive/negative inversion waveform, and the pulse waveform is, preferably, such a shape that relative to a duration time of one preceding polarity, reversion to the other succeeding polarity changes in a short period of time.

Since the response of the dipole moment of the water molecule is relatively slow an asymmetric pulse waveform in which the duration for one preceding polarity of the pulse waveform is relatively long and inversion to other successive polarity changes abruptly in a relatively short period of time is preferred for effectively leaving the polarization electric field of water molecules in the discharge vessel.

Further, the apparatus according to the present invention has been developed as an apparatus for forming the highly oxidative water, comprising a high pressure vessel for dissolving an oxygen rich gas under a high pressure in water, and a low pressure discharge vessel kept at a pressure lower than the high pressure vessel and receiving supply of water an oxygen rich gas is dissolved from the high pressure vessel and wherein a pulse source is connected to the electrodes disposed in the low pressure discharge vessel.

In a preferred embodiment of the apparatus according to the present invention, an oxygen rich gas supply means, a water supply means and a pressure control means are disposed to an aeration/discharge vessel having an aeration means and a pulse discharge means.

This embodiment has a feature in that dissolution of the oxygen rich gas under pressure into water, and generation of oxygen rich gas bubbles by reduction of the pressure and pulse discharge can be conducted successively in one processing vessel by at first constituting to dissolve an oxygen rich gas under a high pressure to water in the aeration/discharge vessel and, subsequently, form oxygen rich bubbles by reducing the pressure and discharging pulse current.

In practicing the present invention described above, it is preferred that rare gases such as argon or xenon are dissolved in addition to oxygen as the oxygen rich gas, since generation of UV-rays upon pulse discharge is enhanced by the rare gases contained in the fine bubbles formed upon reduction of the pressure to further enhance the efficiency of forming the highly oxidative water.

Further, it is preferred to additionally provide a cooling mechanism to a vessel for dissolving the oxygen rich gas under a high pressure since the saturation solubility of the oxygen rich gas to water can be increased and the amount of generation of the oxygen rich bubble by the subsequent reduction of the pressure increase to further improve the rate of forming ozone and/or OH radicals.

Further, in the preferred embodiment of the apparatus according to the present invention, the low pressure discharge vessel comprises a discharge vessel filled with water, two or more electrodes disposed adjacent with a highly dielectric or insulative outer wall of the discharge vessel and a pulse power source for applying AC pulse voltage to the electrodes.

In another preferred embodiment of the apparatus according to the present invention, the low pressure discharge vessel comprises a discharge vessel filled with water, two or more electrodes covered with a highly dielectric or insulative material immersed in a state not in contact with water in water in the discharge vessel and a pulse power source for applying an AC pulse voltage to the electrodes.

Also in the two embodiments of the low pressure discharge vessel, when an aeration means for aerating the oxygen rich gas to water in the discharge vessel is disposed, to supply fine bubbles comprising the oxygen rich gas to the discharge atmosphere, or a dissolution means for dissolving the oxygen rich gas under a high pressure to water in the discharge vessel and fine bubbles generation means for forming the fine bubbles of the oxygen rich gas by the subsequent lowering of the pressure are disposed, to expose the fine bubbles comprising the oxygen rich gas to the discharge atmosphere, ozone is formed by excitation of oxygen in the fine bubbles upon discharge, or OH radicals are formed by UV-rays generated simultaneously, and they are dissolved in water, so that water at a higher oxidizing activity can be obtained more efficiently.

Further, also in this apparatus, an AC pulse voltage having a positive/negative inversion waveform is preferred and the pulse waveform preferably has such a shape that, relative to the duration of one preceding polarity, inversion to the other succeeding polarity changes in a short period of time with the same reason as described above.

PREFERRED EMBODIMENT OF THE INVENTION

In the present invention, as described above, an oxygen rich gas is at first dissolved in a great amount in water then the pressure is lowered to form fine bubbles from dissolved oxygen rich gas in water, and the fine bubbles are exposed to pulse discharge thereby effectively generating ozone and/or OH radicals to form highly oxidative water containing such oxidizing ingredients dissolved in a great amount.

According to this method, fine bubbles can be formed uniformly in the entire region of water to be treated by the pulse discharge step and oxygen in the bubbles is excited to form ozone directly by applying high voltage pulse discharge in synchronization with the formation of the oxygen rich bubbles by lowering reduction of the pressure.

Since the fine bubbles formed upon lowering of the pressure have a larger inner surface area compared with the volume, much more ozone can be dissolved in water compared with the usual aeration/diffusion system. Further, UV-rays are generated together with ozone by the pulse discharge in the fine bubbles and the effect of UV-rays promotes the formation of OH radicals in water near the surface of the bubbles.

That is, in the present invention, after the oxygen rich gas is dissolved in a great amount into water in a processing vessel and then the pressure is lowered to form fine bubbles of the oxygen rich gas and the high voltage pulse discharge is applied simultaneously. Discharge is caused in the entire region of water around a lot of oxygen containing fine bubbles as nuclei formed by the super saturation state caused by lowering of the pressure, in which the reaction of forming ozone or OH radicals from oxygen proceeds efficiently by the discharge energy in individual fine gas bubbles and, as a result, highly oxidative water can be formed at a high efficiency.

The method and the apparatus according to the present invention are to be explained in details with reference to the drawings showing preferred embodiments. It should however be noted that the illustrated embodiment no way restrict the present invention but the invention can be practiced with appropriate modification within a range conforming to the purport of the invention described above and to be described later, any of which is contained in the technical scope of the present invention.

BRIEF DESCRIPTION OF THE DRAWINGS

FIGS. 3A and 3B are schematic explanatory views illustrating a discharge device used in the present invention;

FIG. 4 is an explanatory view for the mechanism of polarization discharge upon practicing the present invention; and FIGS. 5A and 5B are schematic explanatory views illustrating an another discharge device used in the present invention.

DESCRIPTION OF THE PREFERRED EMBODIMENTS

Figure 1:
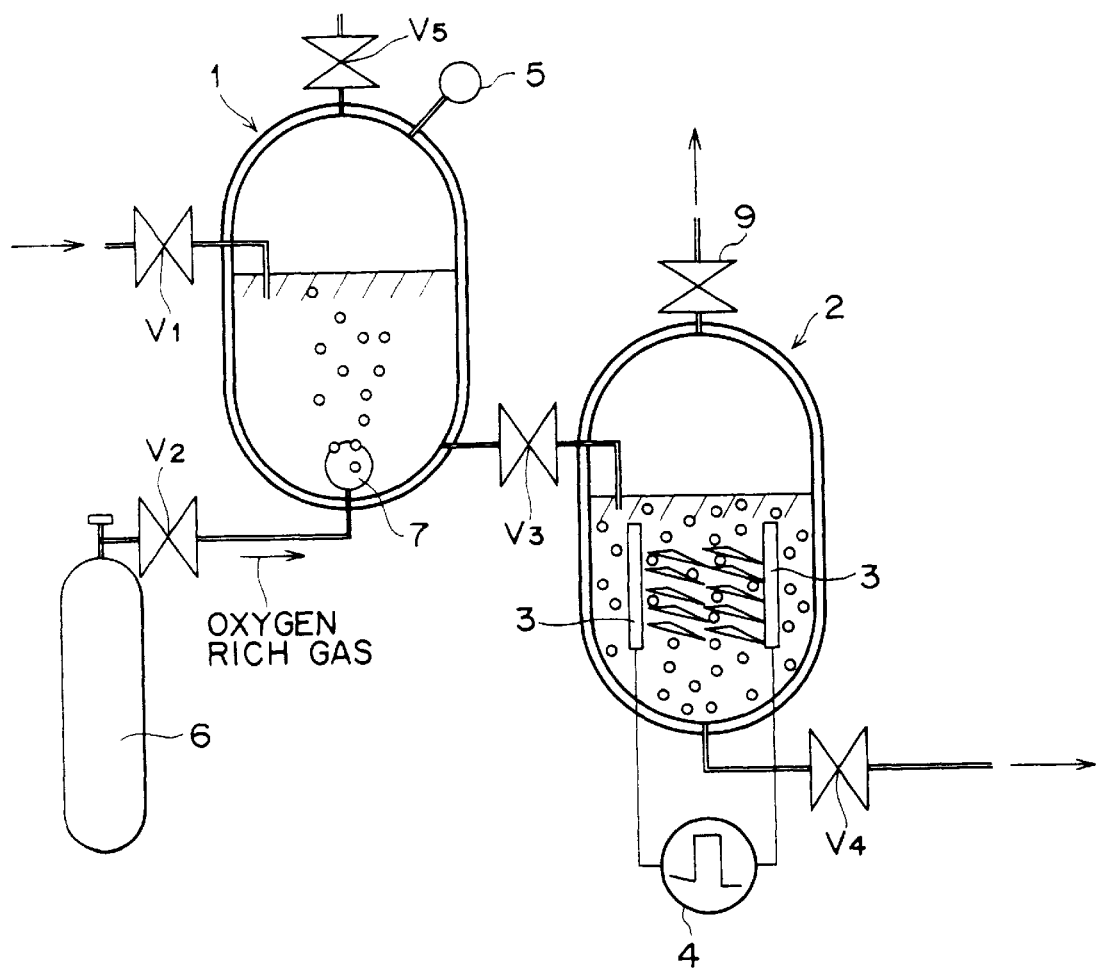
FIG. 1 is a schematic explanatory view illustrating an apparatus for forming highly oxidative water according to the present invention.

FIG. 1 illustrates an apparatus of forming a highly oxidative water according to the present invention, which comprises a high pressure vessel 1, a low pressure vessel 2, discharge electrodes 3, a pulse power source 4 (high voltage pulse potential applying means) and a pressure gauge 5.

When highly oxidative water is produced by using the apparatus, water is introduced from a valve $V_1$ into the high pressure vessel 1, and an oxygen rich gas is blown from a high pressure oxygen reservoir 6 by way of a valve $V_2$ and an aerator 7 as fine bubbles into water and dissolved therein. The pressure in the high pressure vessel 1 is controlled usually to a pressure about from several atm to several tens atm by a pressure control valve $V_5$ while measuring the pressure in the high pressure vessel 1 by the pressure gauge 5. It is preferred to optionally dispose a cooling means in the high pressure vessel 1 so as to cool the water in the inside since the amount of saturated dissolution of the oxygen rich gas into water can be increased further and the retention time of a super saturated state upon lowering of pressure in the low pressure vessel can be made longer.

Further, as the oxygen rich gas either oxygen or air can be used and oxygen is preferably used practically in an industrial scale since this is advantageous in view of the cost. Further, a small amount of rare gases (for example, argon or xenon) is preferably mixed in the oxygen rich gas since UV-rays are generated together with ozone pulse discharge conducted in the succeeding step, which can promote formation of OH radicals at the boundary of the fine bubbles to further improve the efficiency of forming highly oxidative water.

Subsequently, water in which the oxygen rich gas is dissolved in a saturated state is transferred through a valve $V_3$ to the low pressure vessel 2. Then, when a pressure reduction valve 9 is opened to lower the pressure in the low pressure vessel 2, the oxygen rich gas dissolved under pressure in the water to be treated becomes super saturated and fine bubbles (several to several tens $\mu$m) are formed in the entire region of water in the low pressure vessel 2.

About at the same time as the formation of the fine bubbles, when a high voltage pulse is applied to the electrodes 3 from the pulse power source 4, discharge in water is grown and extended around the fine bubbles as nuclei. In this step, silent discharge occurring in the fine bubbles excites oxygen present in the bubbles to form ozone. Since the fine bubble has a larger inner surface as compared with the volume, formed ozone is dissolved rapidly in the water to be treated.

Accordingly, reactions for forming ozone or OH radicals by pulse discharge can be efficiently utilized with no loss by incorporating a control system of applying a high voltage pulse potential to the electrodes in a state of super saturation of the water to be treated before initiation of the formation of the fine bubbles in the low pressure vessel 2, more preferably, at a timing before the average grain size of the fine bubble growth to a certain size upon completion of the formation of the fine bubble by the lowering of the pressure.

In the foregoings, when the high pressure pulse is applied in the saturation state of the water to be treated before starting the formation of the fine bubbles, while the amount of the fine bubbles is still small upon application of the high voltage pulse, the bubbles are formed and grown along dedritic discharge formed in the water to be treated after application of the pulse and, as a result, a sufficient amount of fine bubbles is formed. The fine bubbles exposed to the discharge pulse in the present invention are not restricted only to those formed by dissolving the oxygen rich gas at a high pressure and then lowering the pressure but fine bubbles formed from an oxygen rich gas dissolved in a super saturated state in the water to be treated under the stimulation of the discharge are also included.

A small amount of rare gases is preferably mixed in the oxygen rich gas, since the amount of UV-rays generated during pulse discharge is increased by the presence of the rare gases as described above to promote the OH radical forming reactions at the boundary of the fine bubbles to also increase the dissolution amount of the OH radicals, by which water having higher oxidative performance can be formed Water in which a great amount of ozone/OH radicals are dissolved is extracted through a valve $V_4$. When this method is applied to the waster containing, for example, less biodegradable deleterious materials as described above, since the deleterious materials are oxidized and decomposed into easily biodegradable materials due to the increase of the dissolution amount of ozone and/or OH radicals, the waste water can be purified at high efficiency by the subsequent biodegradation.

Further, highly oxidative water formed by using pure water or deionized water as water can be utilized effectively, for example, as cleaning water used in the field of semiconductor production, as well as can be utilized effectively as an oxidative defoliation agent for resist or as an oxidizing agent for forming oxide layers to various kinds of metal materials.

Figure 2:
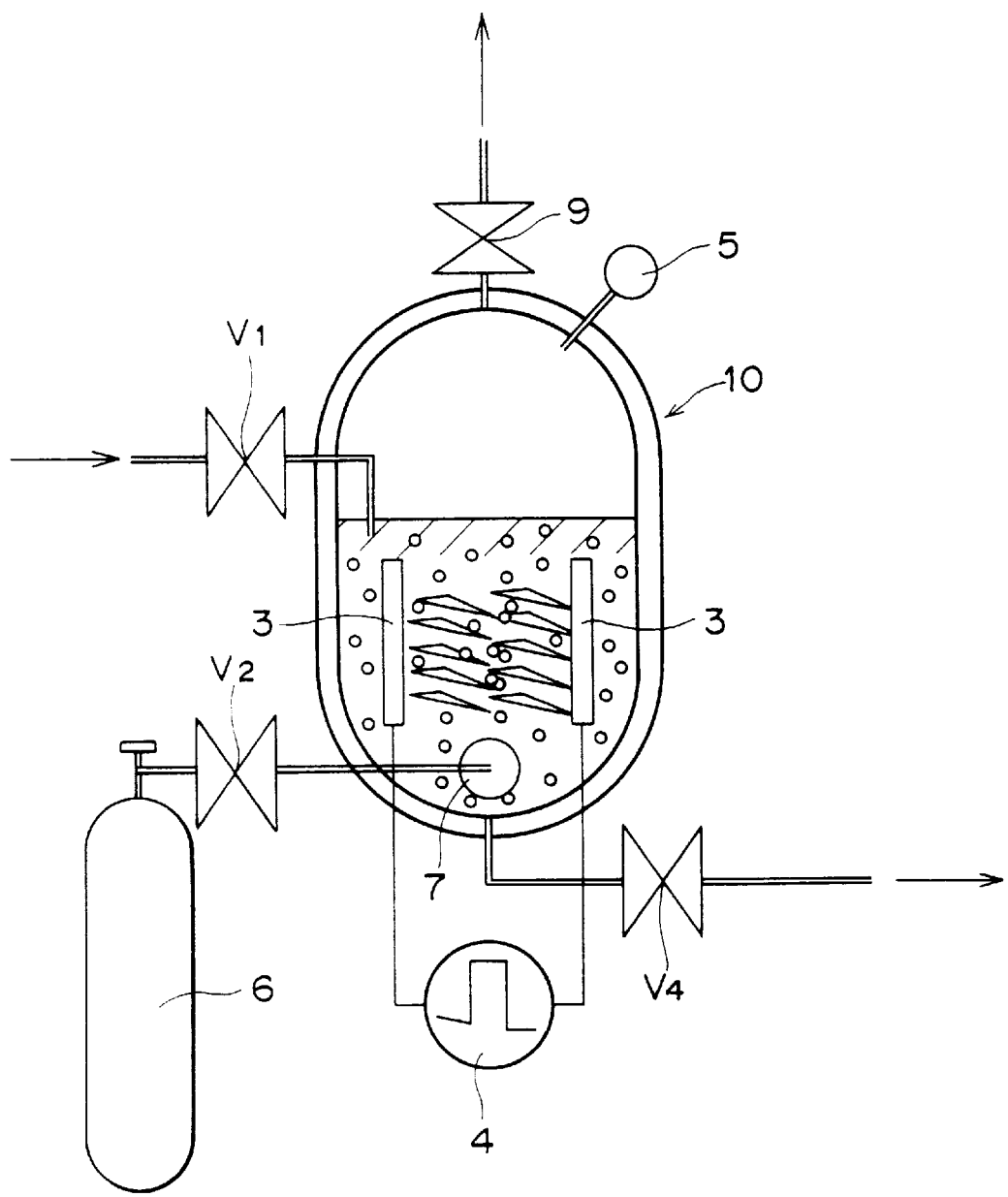
FIG. 2 is a schematic explanatory view illustrating another apparatus for forming highly oxidative water according to the present invention.

FIG. 2 shows another embodiment of the apparatus according to the present invention in which the high pressure vessel 1 and the high pressure vessel 2 can be constituted with one aeration/discharge vessel 10. In this apparatus, a water supply valve $V_1$, a high pressure oxygen reservoir 6 for supplied oxygen rich gas, a valve $V_2$, an aerator 7, electrodes 3 connected to a pulse power sources, a pressure gauge 5, a pressure control valve 9 and a highly oxidative water discharging valve $V_4$ are disposed to one aeration/discharge vessel 10.

When the apparatus is used, water is supplied through the valve $V_1$ into the aeration/discharge vessel 10, and an oxygen rich gas is blown from the high pressure oxygen reservoir 6 through the valve $V_2$ and the aerator 7 as fine bubbles into water to be treated and dissolved therein. The pressure in the aeration/discharge vessel 10 is controlled to an optional high pressure by a pressure control valve $V_5$ while measuring the pressure by the pressure gauge 5.

After the oxygen rich gas has been dissolved, supply of the oxygen rich gas is stopped, and the pressure inside the vessel 10 is lowered by actuating a pressure lowering pump (not illustrated) connected to the pressure control valve 9. Then, the oxygen rich gas dissolved under pressure in water becomes saturated and vaporized in water to form fine bubbles (several to several tens $\mu$m diameter) in the entire region. Then, when a high voltage pulse current is applied to the electrodes 3 from the pulse power source 4 about at the same timing of generating the fine bubbles by the lowering of the pressure, forming in water grows/extends around the fine bubbles as nuclei and silent discharge occurring in the fine bubbles excite oxygen in the fine bubbles to form ozone and the formed ozone is rapidly dissolved into the water to be treated in the same manner as in FIG. 1.

The dissolution amount under pressure of the oxygen rich gas can be increased by disposing a cooling mechanism to the vessel 10 such that temperature at the inside can be lowered upon dissolution of the oxygen rich gas. Further, amount of OH radicals formed can be increased by mixing rare gases in the oxygen rich gas and the oxidative activity of the highly oxidative water obtained can be further enhanced in the same manner as in FIG. 1. Then, water in which ozone and/or OH radicals are dissolved may be discharged from the valve $V_4$.

The materials used for the electrodes in the present invention have no particular restriction so long as the material has electroconductivity such as metals or conductive ceramics. Particularly preferred for the cathode are those materials having corrosion resistance and with less deposits such as stainless steels or thorium alloys. Further, for the anode, those materials with less loss during discharge such as Cu/Zn/Fe alloys or thorium alloys are preferably selected and used.

There are also no particular conditions for the pulse discharge and preferred standard conditions are, for example: an inter-electrode space of 2 mm or more and 50 mm or less, preferably, 15 mm or more and 30 mm or less, an application voltage of 5 kV or higher and 100 kV or lower, preferably, 20 kV or higher and 50 kV or lower, a frequency of the pulse voltage of 30 Hz or higher and 1 MHz or lower, preferably, 60 Hz or higher and 120 Hz lower, a pulse width of 5 nsec or more and 1 msec or less, preferably, 1 $\mu$sec or more and 100 $\mu$sec or less. When the pulse voltage with such a pulse width is used, the consumption power can be saved compared with a case of continuously applying a voltage. Further, it can be expected also for the effect of making the electric field uniform by the high dielectric constant ($\epsilon_r=80$) of the water molecule.

A preferred embodiment of the pulse discharge in the present invention is to dispose electrodes opposed to each other in a state of not in contact with water in the discharge vessel. The method according to the present invention and the constitution of the apparatus used for the method are to be explained more concretely with reference to examples.

FIGS. 3A and 3B are schematic explanatory views illustrating a pulse discharge mechanism of an apparatus in a preferred embodiment of the present invention. In the drawings, are shown an insulative (or highly dielectric) discharge vessel 21, water 12, discharge electrodes 3, a pulse power source 4 and an aerator 7.

FIG. 3A shows a charge distribution in the preceding polarity phase (positive in this case) (shown by arrows in the figure) in the pulse power source 4. Water molecules in the discharge vessel 21 are polarized by the charges on the electrodes to induce polarization charges of an inverted reference on the inner surface spaced by the wall of the discharge vessel 21 to the electrodes. In this case, the electric field is offset by polarization in water and an electric field gradient is concentrated relative to the electrode 3 while putting the wall of the discharge vessel 21 therebetween.

FIG. 3B illustrates a charge distribution and an electric field at the phase of the inverted polarity (shown by arrows in the figure) succeeding to the pulse waveform shown in FIG. 3A. In this case, while electrode charges are offset by the inversion of the pulse polarity, polarization of water in the discharge vessel 21 charges are kept as they are because of the short period of time since polarization response of the water molecule is slow, and the surface charges opposing to the electrode 3 are left as they are. Therefore, a high electric field is formed instantaneously to cause discharge in discharge vessel 21, dissolved oxygen in water is excited to form ozone, and water is excited by UV-rays formed by excitation to form OH radicals and they are successively dissolved into water, to increase the concentration of ozone or OH radicals of the water.

Upon discharge, when the fine bubbles of oxygen rich gas are introduced into water by the method such as aeration prior to the inversion of the potential, change schematically shown in FIG. 4 occurs in the vicinity of the fine bubbles. That is, electric charges are induced at the inner surface of the fine bubble B under the electric field formed in water as shown in the drawing, and, as a result, an intense electric field is formed in the space in the bubble to cause discharge in the bubble. This discharge excites oxygen in the bubble to form ozone, or UV-rays generated in this case excites water at the circumferential surface of the bubble to form OH radicals. Then, the thus formed ozone or OH radicals are successively dissolved in water and, as a result of repeating discharge by the AC pulse, it is possible to dissolve a great amount of ozone and OH radicals in water by current supply for a short period of time to obtain highly oxidative water at a high efficiency.

In this case, when the timing for the change of the AC pulse potential applied to the electrodes and the timing of forming the fine bubbles of the oxygen rich gas are aligned and synchronized, preferably, within a range of 1 sec or less, formation/growing of the fine bubbles and discharge preferably occur simultaneously to proceed the excitation to the oxygen rich gas bubbles in a wider range and uniformly and efficiently.

In FIGS. 3A and 3B, an example of using the aerator 7 for the supply of the oxygen rich gas bubble is illustrated but it is also effective to utilize dissolution of the oxygen rich gas and formation of fine bubbles by the subsequent lowering of the pressure in place of them. For example, the discharge vessel 21 shown in FIGS. 3A and 3B may be constituted as a sealed structure and used as the low pressure vessel 2 shown in FIG. 1 or may be used as the aeration/discharge vessel shown in FIG. 2. In the latter, when the oxygen rich gas is blown under pressure to the discharge vessel 21 to dissolve the oxygen rich gas in a large amount in water and then the pressure in the vessel is allowed to release to lower the pressure, the oxygen rich gas dissolved in a large amount under pressure in water becomes saturated and is formed as fine bubbles over the entire region in water in the discharge vessel 11. Accordingly, when an AC pulse is applied in synchronization with the timing, a great amount of fine bubbles comprising the oxygen rich gas can be caused to be present uniformly over the entire region of the discharge atmosphere, and reactions for forming ozone and OH radicals due to discharge can be proceeded efficiently in each of the fine bubbles.

In this case, when rare gases are mixed in an appropriate amount with the oxygen rich gas, generation of UV-rays in each of the fine bubbles is promoted to further enhance the formation rate of the OH radicals.

FIGS. 5A and 5B are schematic explanatory views illustrating another discharge device according to the present invention, and the device is substantially identical with the embodiment shown in FIGS. 3A and 3B except for covering the electrodes 3 with a highly dielectric or insulative cover member C and immersing them in water in the discharge vessel 21 in state not in contact with water, in place of the electrodes 3 disposed to the outside in the vicinity of the discharge vessel 21 of the apparatus shown in FIGS. 3A and 3B. The effects including the effect of increasing the amount of ozone and OH radicals formed by the supply of the oxygen rich bubbles to the discharge atmosphere are also substantially identical with those described previously. Further, the discharge device 21 is constituted as a sealed structure and may be used as the low pressure vessel 2 shown in FIG. 1 or as the aeration/discharge vessel 10 shown in FIG. 2, and the invention can be modified in the same manner as described above.

As has been described above, the present invention can be utilized effectively for the pretreatment of waste water containing less biodegradable organic or inorganic deleterious materials and, particularly, the effect can be provided more effectively by applying to the waste water containing less biodegradable organic substance or waste water in which the content of the organic materials fluctuates.

The less biodegradable organic materials include, for example, natural or synthetic polymeric compounds such as celluloses, humine materials, surfactants, dyes, rubbers and resins; aromatic compounds such as benzene, toluene, xylene and phenol; aldehyde compounds such as acetaldehyde and crotone aldehyde, and oils and fats, higher fatty acids and other COD ingredients. Concrete example of waste water containing such deleterious organic materials include, for example, waste water from chemical plants, waste water from medicine factories, waste water from foodstuff factories, waste water from oils and fats factories, waste water from pulp factories, or like other industrial waste water, water of rivers and water of lakes and marshes.

The polymeric compounds contained in the waste water are transformed to low molecular weight materials by discharge in water, and aromatic compounds such as benzene, toluene, xylene and phenol are decomposed to organic acid such as oxalic acid or formic acid to show biodegradability and, further, easy biodegradable organic materials can be transformed into low molecular weight materials or decomposed to further improve the biodegradability.

The present invention has been constituted as described above and highly oxidative water containing ozone and OH radicals at high concentration can be prepared at a high efficiency by dissolving an oxygen rich gas under a high pressure and then lowering the pressure to form fine oxygen rich gas bubbles and causing discharge in water by a high voltage pulse in timing therewith. Further, a problem for the leaching of metal electrode can be overcome by opposing the discharge electrodes for the pulse discharge in a state not in contact with water in the discharge vessel. Accordingly, less biodegradable organic materials can be solubilized or made non-deleterious by formed ozone or OH radicals by using organic materials containing water, particularly, water to be treated containing less biodegradable organic materials.

Further, the highly oxidative water formed from pure water or deionized water can be utilized also for cleaning and formation of oxide layers in the production of semiconductors and it can be utilized effectively as a processing technique with no requirement of chemicals such as fluoric acid, which may possibly damage environments.

What is claimed is:

1. A method of forming highly oxidative water which comprises dissolving an oxygen rich gas under a high pressure into water and then lowering a pressure to form the dissolved oxygen rich gas as fine bubbles in the water and exposing the fine bubbles to pulse discharge, thereby forming a highly oxidative water with a large dissolution amount of ozone and/or OH radicals.

2. A method as defined in claim 1, wherein water is waste water containing organic or inorganic deleterious materials and the efficiency for processing the waste water is improved by preparing the waste water with large dissolution amount of ozone and/or OH radicals.

3. A method as defined in claim 1, wherein the pulse discharge is conducted by applying an AC pulse voltage to electrodes opposed to each other in a state not in contact with water in a discharge vessel and carrying out discharge in water by an electric field induced upon inversion of potential and generated in the discharge vessel.

4. A method as defined in claim 3, wherein the fine bubbles comprising the oxygen rich gas are supplied by blowing the oxygen rich gas into water in the discharge vessel.

5. A method as defined in claim 3, wherein the pulse waveform of the AC pulse voltage is such a shape that, relative to a duration time of one preceding polarity, reversion to the other succeeding polarity changes in a short period of time.

6. An apparatus for forming a highly oxidative water comprising a high pressure vessel for dissolving an oxygen rich gas under a high pressure in water, and a low pressure discharge vessel kept at a pressure lower than the high pressure vessel and receiving supply of water in which the oxygen rich gas is dissolved from the high pressure vessel and wherein a pulse source is connected to electrodes disposed in the low pressure discharge vessel.

7. A highly oxidative water forming apparatus as defined in claim 6, wherein an oxygen rich gas supply means, a water supply means and a pressure control means are disposed to an aeration/discharge vessel having an aeration means and a pulse discharge means.

8. A highly oxidative water forming apparatus as defined in claim 6, wherein the low pressure discharge vessel comprises a discharge vessel filled with water, two or more electrodes disposed adjacent to a highly dielectric or insulative outer wall of the discharge vessel and a pulse power source for applying AC pulse voltage to the electrodes.

9. A highly oxidative water forming apparatus as defined in claim 6, wherein the low pressure discharge vessel comprises a discharge container filled with water, two or more electrodes covered with a highly dielectric or insulative material and immersed in water in a state not in contact with water in the discharge vessel and a pulse power source for applying an AC pulse voltage to the electrodes.

* * * * *